(12) United States Patent
Barbieri et al.

(10) Patent No.: US 11,667,428 B2
(45) Date of Patent: Jun. 6, 2023

(54) SHEET PACKAGING MATERTIAL FOR PRODUCING A SEALED PACKAGE CONTAINING A POURABLE PRODUCT AND A PACKAGE OBTAINED THEREFROM

(71) Applicant: TETRA LAVAL HOLDINGS & FINANCE S.A., Pully (CH)

(72) Inventors: Marcello Barbieri, Modena (IT); Andrea Giampieri, Modena (IT); Omar Succi, Campogalliano (IT); Carlo Forcellini, Modena (IT); Luca Ronchetti, Carpi (IT); Lorenzo Zagnoli, Modena (IT); Davide Morciano, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 17/295,067

(22) PCT Filed: Nov. 7, 2019

(86) PCT No.: PCT/EP2019/080538
§ 371 (c)(1),
(2) Date: May 19, 2021

(87) PCT Pub. No.: WO2020/104203
PCT Pub. Date: May 28, 2020

(65) Prior Publication Data
US 2022/0017259 A1    Jan. 20, 2022

(30) Foreign Application Priority Data

Nov. 20, 2018    (EP) ..................................... 18207246

(51) Int. Cl.
| | | |
|---|---|---|
| B65D 5/42 | (2006.01) | |
| B65D 5/56 | (2006.01) | |
| B65D 5/06 | (2006.01) | |

(52) U.S. Cl.
CPC .......... B65D 5/064 (2013.01); B65D 5/4266 (2013.01); B65D 5/563 (2013.01)

(58) Field of Classification Search
CPC ............ B65D 5/061–066; B65D 5/563; B65D 5/4266
(Continued)

(56) References Cited

U.S. PATENT DOCUMENTS

| | | | | |
|---|---|---|---|---|
| 4,586,650 A | * | 5/1986 | Sasaki .................... | B65D 5/064 229/920 |
| 5,704,886 A | * | 1/1998 | Sampaolo .............. | B65D 5/064 83/345 |

(Continued)

FOREIGN PATENT DOCUMENTS

| | | |
|---|---|---|
| CN | 106715277 A | 5/2017 |
| CN | 107264913 A | 10/2017 |

(Continued)

OTHER PUBLICATIONS

Office Action dated Jan. 4, 2022, by the State Intellectual Property Office of People's Republic of China in corresponding Chinese Patent Application No. 201911138828.2. (8 pages).

(Continued)

*Primary Examiner* — Nathan J Newhouse
*Assistant Examiner* — Phillip D Schmidt
(74) *Attorney, Agent, or Firm* — Buchanan Ingersoll & Rooney PC

(57) ABSTRACT

A sheet packaging material for producing a sealed package comprises two first boundary edges parallel to a longitudinal direction and two second boundary edges parallel to a (Continued)

transversal direction orthogonal to the longitudinal direction. The sheet packaging material includes at least a bottom transversal crease line including a bottom central portion, a bottom end portion and a bottom side portion. The sheet packaging material includes a pair of slanted crease lines inclined relative to both the longitudinal and transverse directions. The slanted crease lines have first ends pointing to one of the second boundary edges and second ends pointing to a continuous line parallel to the transversal direction and including the bottom central portion and the bottom end portion. The slanted crease lines delimit, with the bottom side portion, a flap area of the sheet packaging material designed to form at least part of a lateral flap of the package.

10 Claims, 5 Drawing Sheets

(58) Field of Classification Search
USPC ............................ 229/138–154, 184, 198.2
See application file for complete search history.

(56) References Cited

U.S. PATENT DOCUMENTS

| | | | |
|---|---|---|---|
| 5,803,349 A | 9/1998 | Ljungstrom | |
| 5,848,749 A * | 12/1998 | Ljungstrom | B65D 5/067 |
| | | | 229/137 |
| 8,235,279 B2 * | 8/2012 | Thingelstad | B65D 5/061 |
| | | | 229/184 |
| 9,162,786 B2 | 10/2015 | Sanfilippo et al. | |
| 11,299,314 B2 * | 4/2022 | Dammers | B65D 5/064 |
| 2017/0174387 A1 * | 6/2017 | Johansson | B65B 9/10 |
| 2017/0253365 A1 | 9/2017 | Barbieri et al. | |
| 2019/0337666 A1 * | 11/2019 | Dammers | B65D 5/064 |

FOREIGN PATENT DOCUMENTS

| | | | | |
|---|---|---|---|---|
| CN | 207045926 U | 2/2018 | | |
| CN | 108357749 A | 8/2018 | | |
| CN | 213535435 U | 6/2021 | | |
| DE | 102016003827 A1 | 10/2017 | | |
| IL | 65904 A * | 10/1984 | ............ | B65D 5/061 |
| JP | 2017013860 A | 1/2017 | | |
| WO | 2005/056404 A1 | 6/2005 | | |
| WO | 2020/104203 A1 | 5/2020 | | |

OTHER PUBLICATIONS

International Search Report (PCT/ISA/210) and Written Opinion (PCT/ISA/237) dated Jan. 13, 2020, by the European Patent Office as the International Searching Authority for International Application No. PCT/EP2019/080538.

* cited by examiner

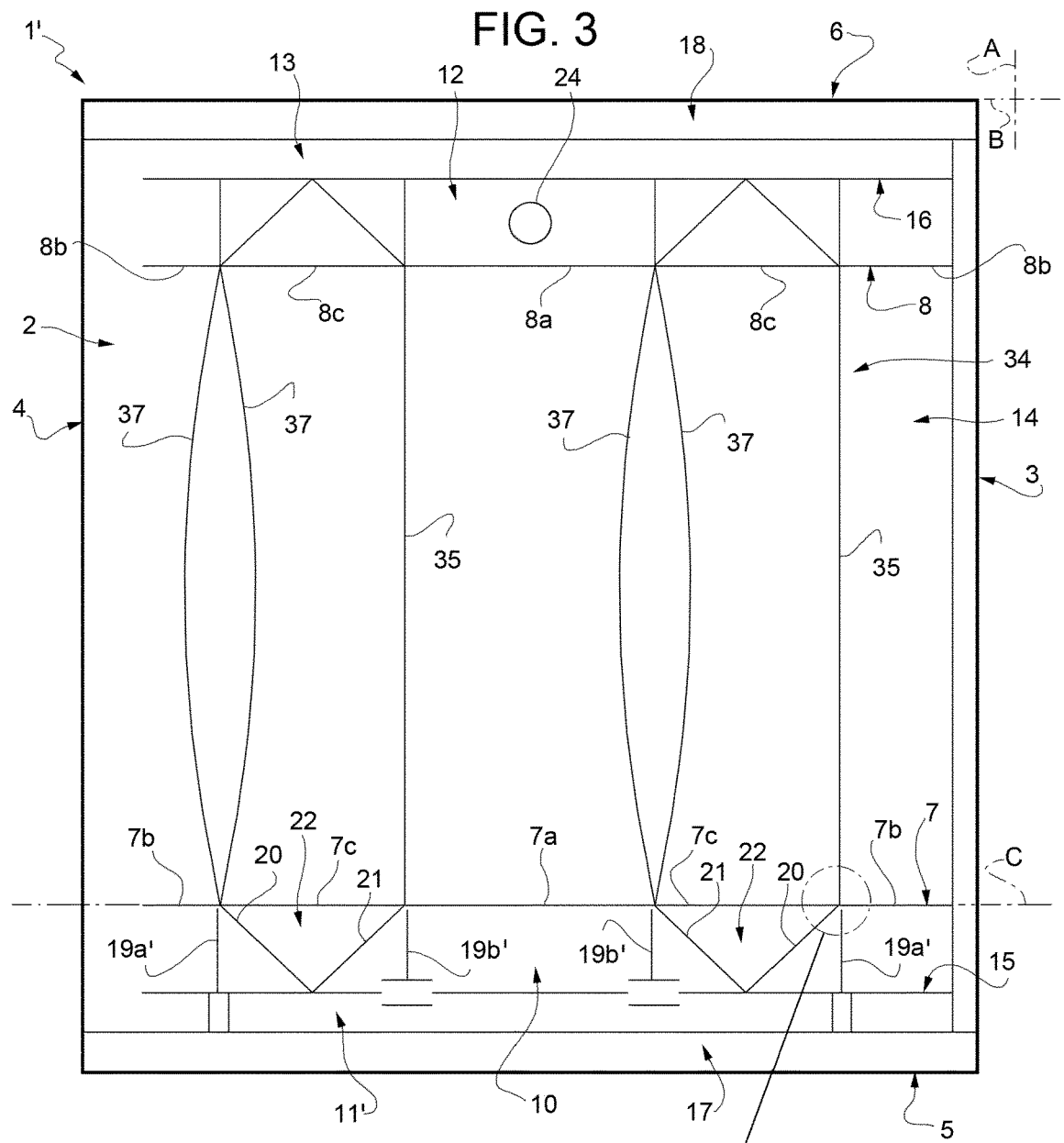
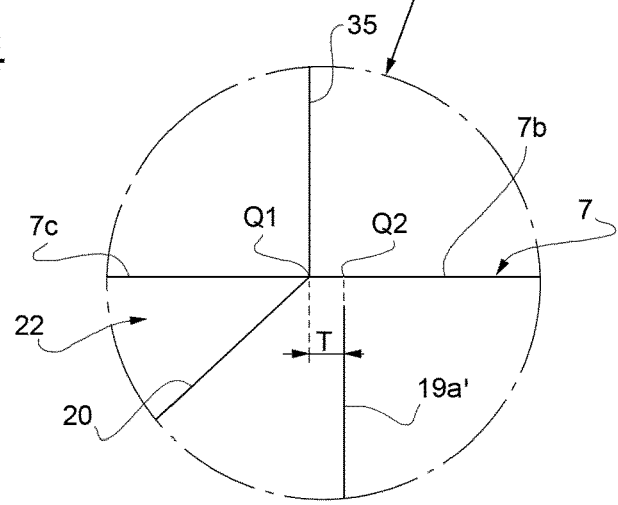

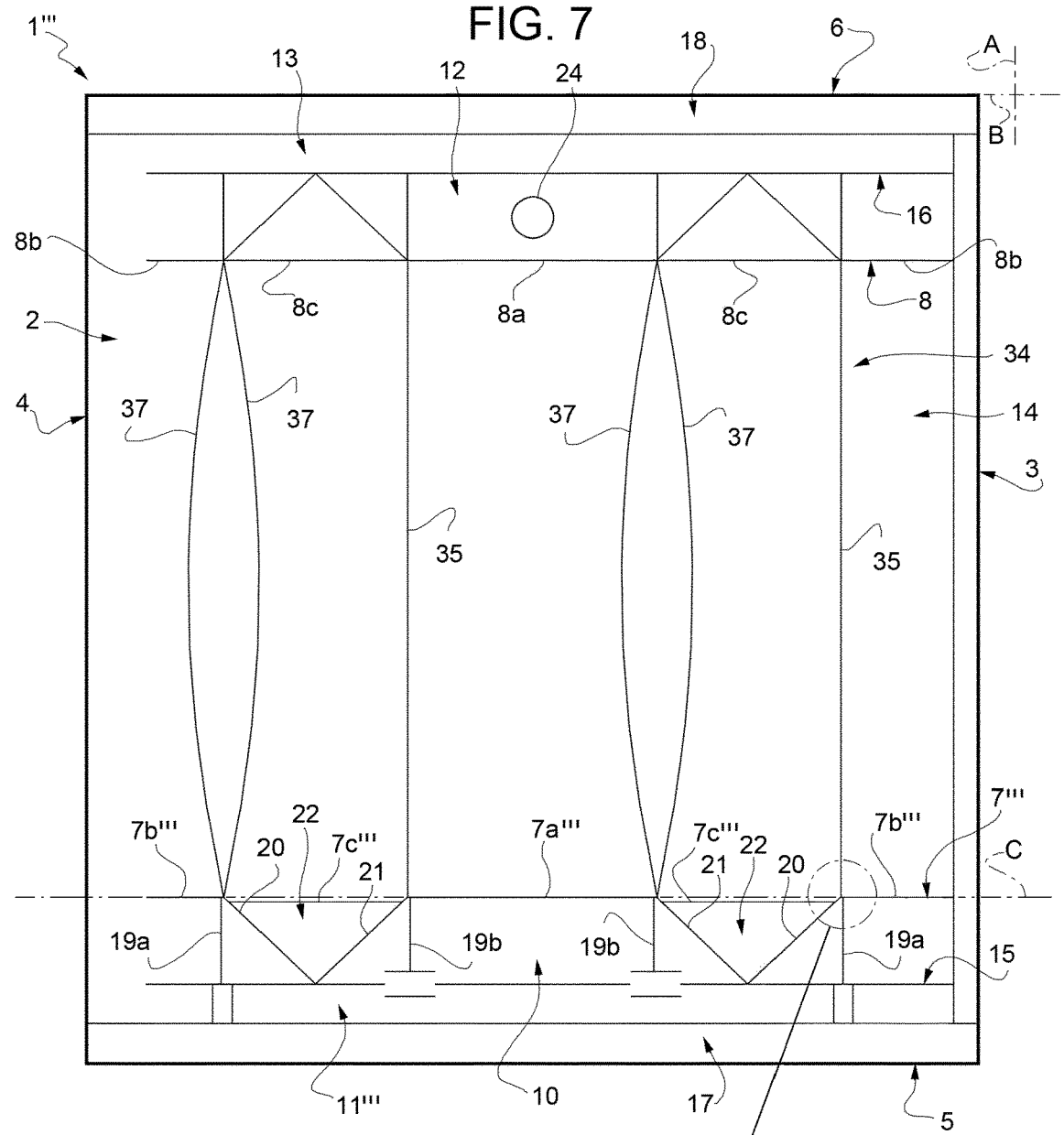
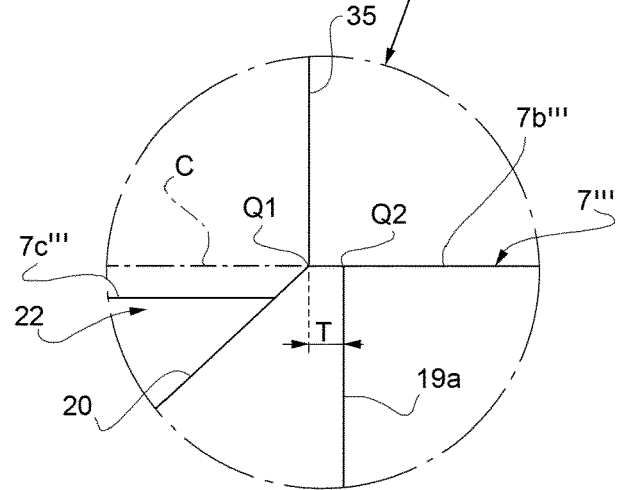

SHEET PACKAGING MATERIAL FOR PRODUCING A SEALED PACKAGE CONTAINING A POURABLE PRODUCT AND A PACKAGE OBTAINED THEREFROM

TECHNICAL FIELD

The present invention relates to a sheet packaging material for producing a sealed package containing a pourable product, in particular a pourable food product.

The present invention also relates to a sealed package containing a pourable product, in particular a pourable food product, obtained from the above-mentioned sheet packaging material.

BACKGROUND ART

As commonly known, many pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by folding, sealing and cutting a web of laminated packaging material. In particular, the packaging material has a multilayer structure comprising a base layer, e.g. of paper, covered on both sides with layers of heat-seal plastic material, e.g. polyethylene. In the case of aseptic packages for long-storage products, such as UHT milk, the packaging material also comprises a barrier layer of oxygen-barrier material, e.g. an aluminum foil, which is superimposed on a layer of heat-seal plastic material, and is in turn covered with another layer of heat-seal plastic material forming the inner face of the package eventually contacting the food product.

Packages of this sort are normally produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; the web so sterilized is then maintained in a closed, sterile environment, and is folded and sealed longitudinally to form a tube, which is fed vertically.

In order to complete the forming operations, the tube is filled with the sterilized or sterile-processed food product, and is sealed and subsequently cut along equally spaced cross sections; pillow packs are so obtained, which are then folded mechanically to form respective finished packages at a final folder.

To allow folding of the web packaging material both during forming and final folding, crease lines, i.e. weakening lines, are formed in the packaging material at the production plant of the packaging material by creasing rolls. In practice, the crease lines define folding lines along which the pillow packs are folded to take the desired final configuration.

Alternatively, the packaging material may be cut into blanks, which are formed into packages on forming spindles, and the resulting packages are then filled with the food product and sealed. One example of this type of package is the so-called "gable-top" package known by the trade name Tetra Rex (registered trademark).

To open the above-described packages, these are normally provided with a removable portion, which is partly detached by a re-closable opening device from the rest of the packaging material to free a pour opening through which to pour out the product.

The removable portion is formed on the packaging material prior to folding and sealing the packaging material to form the finished package.

The removable portion normally comprises a so-called "prelaminated" hole, i.e. a circular hole formed through the base layer only of the packaging material and covered, when the material is laminated, with the layers of heat-seal plastic material and barrier material, which adhere to one another at the hole.

Each package of the above type, either cut from a tube of packaging material or formed on a forming spindle, is obtained from a basic unit of packaging material having given crease lines.

In other words, the above-mentioned basic unit represents the exact length of the packaging material used to produce one single package.

In the case of packages made from a tube of packaging material, the original web includes a plurality of basic units joined to each other; in the case of packages made on forming spindles, the basic unit is defined by the blank.

The basic unit typically has a rectangular or square configuration with two first boundary edges parallel to a longitudinal direction and two second boundary edges parallel to a transversal direction orthogonal to the longitudinal direction. Therefore, the second boundary edges are orthogonal to the first boundary edges.

Once the basic unit is folded and sealed to form the respective finished package, the longitudinal direction becomes the direction along which the total height of the package is defined; the longitudinal direction also represents the main direction of extension of the web from which the basic unit is obtained.

The basic unit usually includes at least two transversal crease lines extending transversally to the longitudinal direction and dividing the basic unit into:

a bottom region containing a bottom crease pattern and configured to form a bottom portion of the finished package;

a top region containing a top crease pattern and configured to form a top portion of the finished package; and an intermediate region contained between the transversal crease lines, interposed between the bottom region and the top region, configured to form a lateral main portion of the finished package and usually having an intermediate crease pattern, i.e. a plurality of longitudinal crease lines designed to form lateral edges of a plurality of side walls of the lateral main portion.

Alternatively, some types of package are obtained by folding and sealing a basic unit of packaging material lacking the longitudinal crease lines in the intermediate region.

In light of the above, the basic unit includes a top transversal crease line and a bottom transversal crease line, which are also configured to define, respectively, a top peripheral edge and a bottom peripheral edge of the finished package having endless configurations and respectively dividing the bottom portion and the top portion from the lateral main portion of the finished package.

The bottom portion of the finished package normally includes a bottom panel defining the resting surface of the package.

The top portion of the finished package may include a flat and horizontal top panel, parallel to the bottom panel; alternatively, gable top portions or slanted top portions are very conveniently used in combination with re-closable opening devices because sloping top panels are wider than corresponding flat top panels of parallelepiped or prismatic packages and therefore allow the application of larger opening devices, e.g. provided with screw caps or the like.

Generally, the top crease pattern and the bottom crease pattern include respective longitudinal crease lines parallel to the longitudinal direction and respectively extending within the top region or the bottom region.

More precisely, each one of the top crease pattern and the bottom crease pattern includes four of such longitudinal crease lines, two more external and two more internal, relatively to the first boundary edges of the basic unit.

Between each pair of such longitudinal crease lines, i.e. between one internal longitudinal crease line and the corresponding external longitudinal crease line, two slanted crease lines are included, which are inclined relatively to both the longitudinal direction and the transversal direction.

In particular, the slanted crease lines of each pair have one end in common located on a further transversal crease line parallel to the top transversal crease line or bottom transversal crease line respectively, and opposite ends located at the intersection points between such top transversal crease line or bottom transversal crease line and the longitudinal crease lines of the same pair, respectively.

In this way, each pair of slanted crease lines delimits a triangle with the segment of top transversal crease line or bottom transversal crease line comprised between the opposite ends of such slanted crease lines.

Each area between longitudinal crease lines is configured to define one respective top lateral flap or bottom lateral flap of the finished package.

In particular, once formed, the two top lateral flaps are folded, along the respective longitudinal crease lines, outwardly onto the lateral main portion of the package, whereas the two bottom lateral flaps are folded, along the respective longitudinal crease lines, inwardly onto the bottom panel of the package.

It is known in the field a possible weakening of the sheet packaging material during folding of the bottom lateral flaps of the package, especially along the above-mentioned longitudinal crease lines.

More precisely, this weakening can occur due to the fact that the bottom lateral flaps have to be folded onto the bottom panel inwardly towards the interior of the package of a supplementary angle with respect to the horizontal direction, so as to ensure a proper planarity, or a substantially domed configuration, of the bottom end on which the package stands, in use, thereby guaranteeing the stability of the package.

Although the sheet packaging material known in the art is both structurally and functionally valid, there is still room for further improvement, in particular as to avoid the aforementioned sheet packaging material weakening during folding of the bottom lateral flaps and to avoid a non-optimal forming of the package, especially at the corners of the package.

DISCLOSURE OF INVENTION

It is therefore an object of the present invention to provide a sheet packaging material, which is designed to meet the above-mentioned need in a straightforward and low-cost manner.

This object is achieved by a sheet packaging material as claimed in claim 1.

BRIEF DESCRIPTION OF THE DRAWINGS

Four non-limiting embodiments of the present invention will be described by way of example with reference to the accompanying drawings, in which:

FIG. 3 is a front view of a basic unit of a sheet packaging material according to a second embodiment of the present invention;

FIG. 4 is a larger-scale, partial front view of a detail of the sheet packaging material of FIG. 3;

FIG. 7 is a front view of a basic unit of a sheet packaging material according to a fourth embodiment of the present invention;

FIG. 8 is a larger-scale, partial front view of a detail of the sheet packaging material of FIG. 7.

BEST MODE FOR CARRYING OUT THE INVENTION

Figure 1:
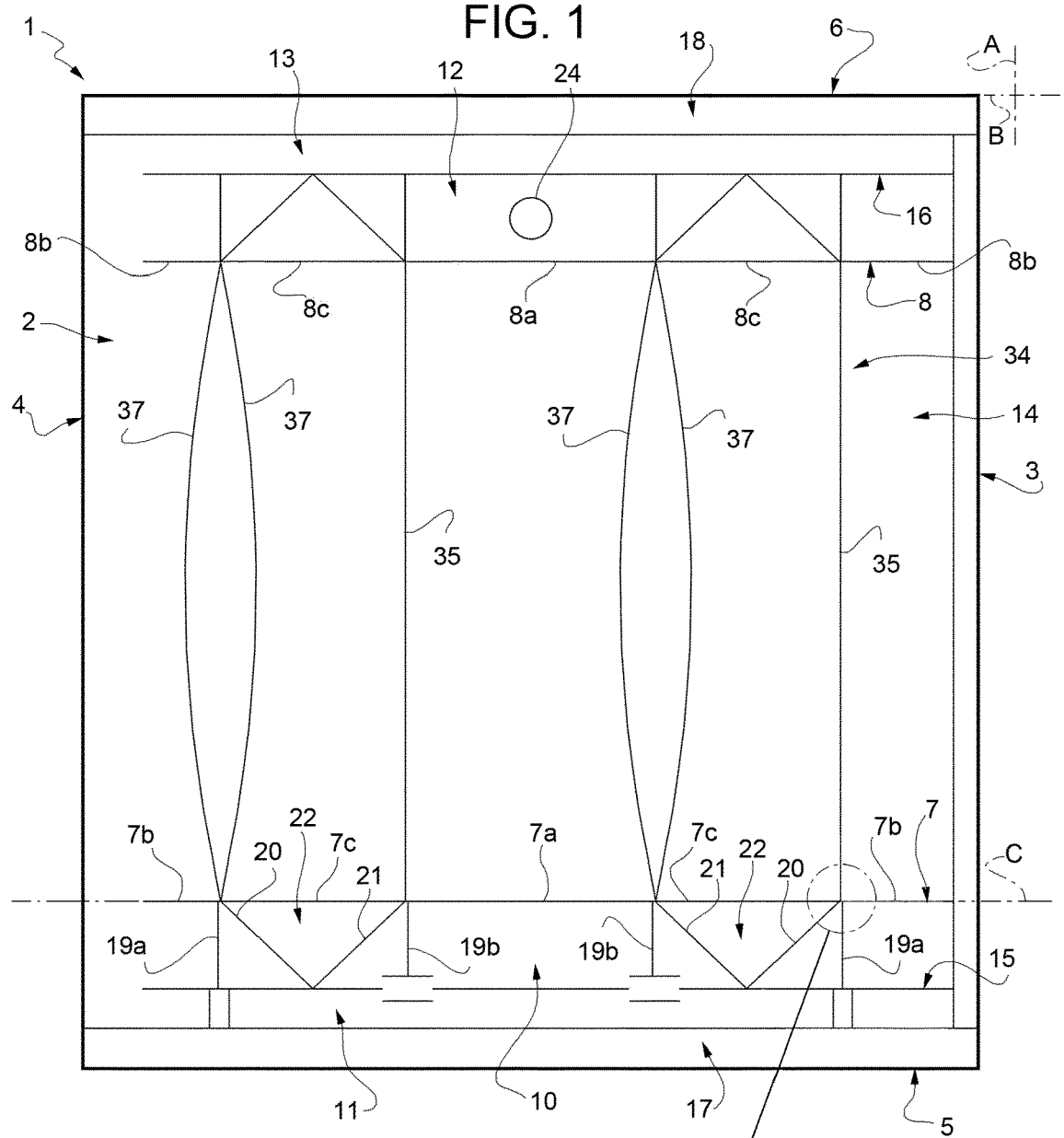
FIG. 1 is a front view of a basic unit of a sheet packaging material according to a first embodiment of the present invention.

With reference to FIG. 1, number 1 indicates as a whole a basic unit of a sheet packaging material 2 for producing a sealed package P (FIG. 9) containing a pourable product, in particular a pourable food product, such as fruit juice, UHT (ultra-high-temperature treated) milk, wine, tomato sauce, etc.

In particular, packaging material 2 has a known multilayer structure (not shown) comprising a base layer, e.g. made of paper, for stiffness, and a number of lamination layers covering both sides of the base layer.

Preferably, the lamination layers comprise one layer of oxygen-barrier material, e.g. an aluminum foil, and a number of layers of heat-seal plastic material covering both sides of the base layer and both sides of the layer of oxygen-barrier material. In other words, by proceeding from the side which will eventually form the inside of package P, packaging material 2 comprises one layer of heat-seal plastic material, one layer of oxygen-barrier material, another layer of heat-seal plastic material, the base layer, and one or more additional layers of heat-seal plastic material.

As shown in FIG. 1, basic unit 1 of packaging material 2 has a rectangular configuration and is delimited by:

two side boundary edges 3, 4 parallel to a longitudinal direction A coinciding with a longitudinal direction in an upright condition of basic unit 1;

a bottom boundary edge 5 parallel to a transversal direction B orthogonal to longitudinal direction A; and a top boundary edge 6 parallel to transversal direction B and to bottom boundary edge 5.

In particular, longitudinal direction A is the direction along which the total height of package P will be defined.

It is pointed out that, in the present description and in the claims, the term "total height" means either the height of package P when the latter has a constant height or the maximum height of package P when the latter has a variable height.

Basic unit 1 may be a precut blank, or a portion of a web of packaging material 2 comprising a succession of basic units 1.

In the first case, basic unit 1 is folded on a known forming spindle (not shown), is filled with the pourable product, and is sealed at the top to form package P.

In the second case, the web of packaging material 2, comprising a succession of basic units 1, is:
folded into a cylinder and sealed longitudinally to form a vertical tube;
filled continuously with the pourable product; and
sealed transversely and cut into basic units 1, which are then folded to form respective packages P.

To allow folding and forming of each package P, each basic unit 1 of packaging material 2 comprises a number of crease lines defining respective folding lines, along which the packaging material 2 is configured to be folded.

In detail, basic unit 1 of packaging material 2 comprises a bottom transversal crease line 7 and a top transversal crease line 8, both extending parallel to transversal direction B.

In greater detail, bottom transversal crease line 7 can be a continuous crease line or a broken (non-continuous) crease line.

Bottom transversal crease line 7 and top transversal crease line 8 divide the basic unit 1 into:
a bottom region 10 containing a bottom crease pattern 11 and configured to form a bottom portion 25 (FIG. 9) of the package including a bottom panel (not shown), preferably a flat and horizontal bottom panel having a quadrilateral, i.e. rectangular or square (in this specific example described rectangular), profile and defining the resting surface of package P;
a top region 12 containing a top crease pattern 13 and configured to form top portion 26 of the package including a top panel 27, preferably a flat and horizontal top panel having a quadrilateral, i.e. rectangular or square (in this specific example described rectangular), profile, or a slanted, i.e. inclined, top panel; and
an intermediate region 14 contained between bottom transversal crease line 7 and top transversal crease line 8, interposed between bottom region 10 and top region 12, with respect to longitudinal direction A, and designed to form a main portion 28 of package P having a plurality of side walls 29.

In greater detail, bottom transversal crease line 7 extends parallel to bottom boundary edge 5 and top boundary edge 6 and is arranged closer to bottom boundary edge 5 than top transversal crease line 8. Bottom transversal crease line 7 is configured to define a bottom peripheral edge 30 of package P dividing main portion 28 from bottom portion 25.

In particular, bottom transversal crease line 7 includes:
a bottom central portion 7a configured to define a bottom front edge 30a of package P;
two bottom end portions 7b arranged on opposite sides of bottom central portion 7a, located adjacent to respective side boundary edges 3, 4 and configured to define a bottom rear edge (not shown) of package P; and
two bottom side portions 7c, adjacent to opposite sides of bottom central portion 7a, each extending between bottom central portion 7a and one respective bottom end portion 7b, and designed to define two respective bottom side edges 30b (only one shown in FIG. 9) of package P.

Top transversal crease line 8 is arranged closer to top boundary edge 6 than bottom transversal crease line 7 and is configured to define a top peripheral edge 31 of package P dividing main portion 28 from top portion 26.

In particular, top transversal crease line 8 includes:
a top central portion 8a configured to define a top front edge 31a of package P;
two top end portions 8b arranged on opposite sides of top central portion 8a, located adjacent to respective side boundary edges 3, 4 and configured to define a top rear edge 31b of package P; and
two top side portions 8c, extending adjacent to opposite sides of top central portion 8a, each connecting top central portion 8a to one respective top end portions 8b, and designed to define two respective top side edges 31c of package P.

Basic unit 1 includes two further transversal crease lines, namely a further bottom transversal crease line 15 and a further top transversal crease line 16, both extending parallel to transversal direction B, and placed near bottom boundary edge 5 and top boundary edge 6, respectively.

In detail, further bottom transversal crease line 15 and further top transversal crease line 16 delimit with bottom boundary edge 5 and top boundary edge 6 respective bottom transversal sealing area 17 and top transversal sealing area 18 configured to define respective bottom transversal sealing band and top transversal sealing band of package P, along which the above-mentioned vertical tube of packaging material 2 is sealed transversely and cut during the forming operation of package P.

Bottom crease pattern 11 is designed to produce the bottom panel and two substantially triangular bottom lateral flaps (not shown) which will be folded inwardly towards, in particular onto, the bottom panel of package P.

With reference to FIG. 1, bottom crease pattern 11 includes four longitudinal crease lines 19a, 19b parallel to longitudinal direction A and extending within bottom region 10, in particular between bottom transversal crease line 7 and further bottom transversal crease line 15.

More specifically, longitudinal crease lines 19b are the most internal ones, whilst longitudinal crease lines 19a are located near opposite side boundary edges 3 and 4, respectively; the area between longitudinal crease lines 19b, as well as the areas delimited by longitudinal crease lines 19a with the respective side boundary edges 3, 4 are configured to define the bottom panel of package P.

In each of the areas delimited between one longitudinal crease line 19a and the corresponding longitudinal crease line 19b, bottom crease pattern 11 further includes one pair of additional crease lines, in particular one pair of slanted crease lines 20, 21 inclined relatively to both longitudinal direction A and transversal direction B and extending within bottom region 10, preferably between bottom transversal crease line 7 and further bottom transversal crease line 15.

In particular, the slanted crease lines 20, 21 have one end in common located on further bottom transversal crease line 15 and opposite ends pointing to a continuous line C parallel to transversal direction B and including bottom central portion 7a and bottom end portions 7b of bottom transversal crease line 7. Slanted crease lines 20, 21 delimit, together with the respective bottom side portion 7c, a flap area, preferably a substantially triangular area 22.

According to this specific preferred embodiment, bottom central portion 7a, bottom end portions 7b and bottom side portions 7c of bottom transversal crease line 7 are aligned to one another and to continuous line C (FIGS. 1 to 6).

According to an alternative embodiment (FIGS. 7 and 8), bottom central portion 7a, bottom end portions 7b and bottom side portions 7c may not be aligned to one another and to continuous line C. In particular, bottom central portion 7a, bottom end portions 7b and bottom side portions 7c may be parallel to one another and to continuous line C, but bottom side portions 7c could be spaced from continuous line C by a longitudinal offset along longitudinal direction A.

Figure 2:
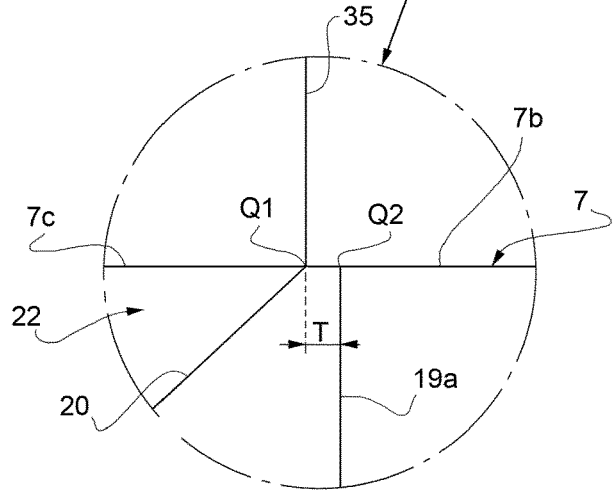
FIG. 2 is a larger-scale, partial front view of a detail of the sheet packaging material of FIG. 1.

In the embodiment shown in FIGS. 1 and 2, the above-mentioned opposite ends of slanted crease lines 20, 21 are located on continuous line C, in particular on bottom transversal crease line 7. In this way, slanted crease lines 20, 21 delimit the respective triangular area 22 together with the segment of bottom transversal crease line 7 comprised between the opposite ends of slanted crease lines 20, 21 themselves.

More precisely, the latter segment is defined by one bottom side portion 7c of bottom transversal crease line 7; therefore, bottom side portion 7c defines a base of such respective triangular area 22.

Each area comprised between longitudinal crease lines 19a and 19b, including triangular area 22, is configured to define one respective bottom lateral flap (not shown) of package P.

Furthermore, with reference to a single pair of longitudinal crease lines 19a, 19b, longitudinal crease lines 19a, 19b of such pair are arranged at opposite sides of the respective triangular area 22, relatively to transversal direction B, and define together a folding line about which the relative bottom lateral flap is designed to be folded inwardly, as stated above.

As shown in FIG. 1 and, on a larger-scale and only for one slanted crease line 20 in FIG. 2, projections of slanted crease lines 20, 21 on continuous line C along respective directions parallel to slanted crease lines 20, 21 identify on continuous line C, i.e. intersect continuous line C at, respective first points Q1 (only one shown in FIG. 2), arranged at respective opposite sides of the relative triangular area 22.

According to this specific embodiment, slanted crease lines 20, 21 directly intersect bottom transversal crease line 7 at first points Q1; therefore, first points Q1 define intersection points between each slanted crease line 20, 21 and bottom transversal crease line 7, thereby delimiting corresponding bottom side portions 7c.

More specifically, each first point Q1 defines a base vertex of the respective triangular area 22.

Advantageously, projections of each pair of longitudinal crease lines 19a, 19b on continuous line C along longitudinal direction A identify on continuous line C, i.e. intersect continuous line C, at respective second points Q2 (only one shown in FIG. 2), each one of which is arranged at one respective side of the relative triangular area 22 surrounded by that pair of longitudinal crease lines 19a, 19b and is spaced from the corresponding first point Q1 arranged on that same one side of the relative triangular area 22, along transversal direction B, by a transversal offset T (shown in FIG. 2).

According to this specific embodiment, longitudinal crease lines 19a, 19b directly intersect bottom transversal crease line 7 at second points Q2; therefore, second points Q2 define intersection points between each longitudinal crease line 19a, 19b and bottom transversal crease line 7.

By way of example, the slanted crease line 20 located adjacent to side boundary edge 3 intersects bottom transversal crease line 7 at one first point Q1; the corresponding longitudinal crease line 19a, i.e. the one located adjacent to side boundary edge 3, intersects bottom transversal crease line 7 at one second point Q2 which is spaced from the latter first point Q1 by transversal offset T (FIG. 2).

Since basic unit 1 comprises four (two pairs of) longitudinal crease lines 19a, 19b and four (two pairs of) slanted crease lines 20, 21, four second points Q2 and four first points Q1 are identified on basic unit 1.

Preferably, the two second points Q2 of each pair, arranged at opposite sides of one respective triangular area 22, are external to the segment delimited by the corresponding first points Q1, i.e. are external to the corresponding bottom side portion 7c of bottom transversal crease line 7. The latter feature is applicable to both pairs of second points Q2 of basic unit 1.

Preferably, all second points Q2 of basic unit 1 are respectively spaced from the corresponding first points Q1, i.e. from the nearest first points Q1 located on the same side of the relative triangular area 22, by the same transversal offset T.

Preferably, transversal offset T is comprised in the range of 0.1 mm to 2 mm.

Top crease pattern 13 is designed to produce, in a manner known and not described in detail, top panel 27 and two substantially triangular top lateral flaps 32 (only one shown in FIG. 9) which are configured to be folded outwardly towards, in particular onto, main portion 28.

Furthermore, top crease pattern 13 includes a removable portion 24 arranged in the area of top region 12.

Preferably, removable portion 24 comprises a so-called "prelaminated" hole, i.e. a circular hole formed through the base layer only of packaging material 2 and covered, when the material is laminated, with the layers of heat-seal plastic material and barrier material, which adhere to one another at the hole.

Once package P is completely folded, a known opening device 33 (FIG. 9) is applied onto top panel 27 by conventional fastening systems, such as adhesives, or by micro-flame, electric-current-induction, ultrasound, laser, or other heat-sealing techniques, so as to cover removable portion 24.

Figure 9:
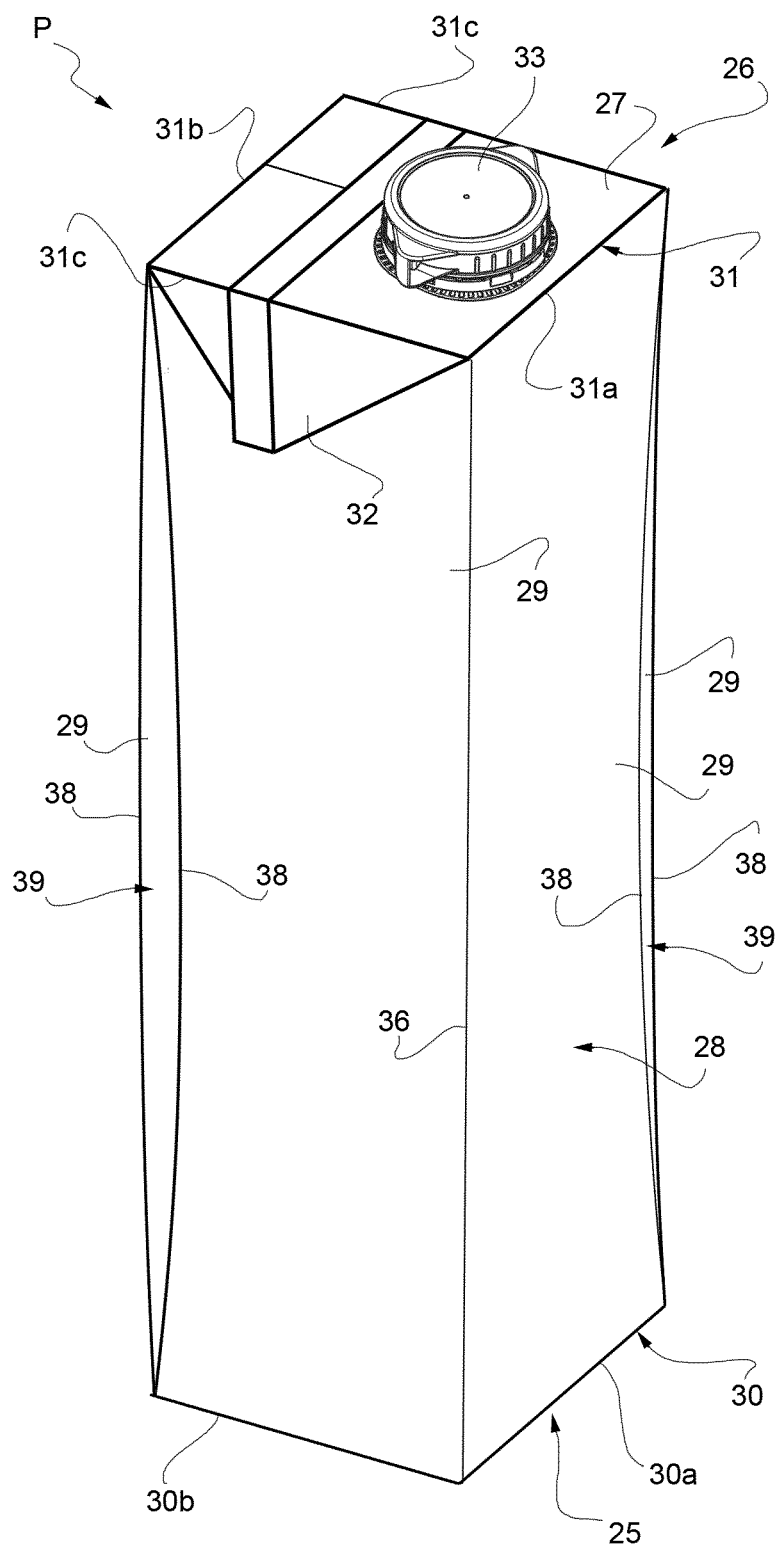
FIG. 9 is a perspective view of a package obtained from the basic unit of FIG. 1.

According to this preferred non-limiting embodiment shown, intermediate region 14 contains an intermediate crease pattern 34 comprising:

two intermediate longitudinal crease lines 35, parallel to longitudinal direction A, extending within intermediate region 14, in particular between bottom transversal crease line 7 and top transversal crease line 8, and configured to form respective longitudinal lateral edges 36 (FIG. 9) of main portion 28; and two pairs of intermediate curved crease lines 37 extending within intermediate region 14, in particular between bottom transversal crease line 7 and top transversal crease line 8, and configured to form respective curved lateral edges 38 of main portion 28 delimiting respective leaf portion 39 of package P (FIG. 9).

In detail, intermediate curved crease lines 37 extend substantially along longitudinal direction A.

In greater detail, intermediate curved crease lines 37 of one pair delimit a leaf-shaped area of main portion 28 and have their opposite ends in common with one another and pointing to top transversal crease line 8 and bottom transversal crease line 7, respectively.

More specifically, projections of intermediate longitudinal crease lines 35 or of intermediate curved crease lines 37 on continuous line C, respectively along longitudinal direction A or along directions parallel to intermediate curved crease lines 37, coincide with the respective first points Q1.

In this specific example described, both intermediate longitudinal crease lines 35 and intermediate curved crease lines 37 directly intersect bottom transversal crease line 7 at respective first points Q1; therefore, first points Q1 define intersection points between each intermediate longitudinal crease line 35 or intermediate curved crease line 37 and bottom transversal crease line 7, thereby delimiting, on bottom transversal crease line 7, corresponding bottom side portions 7c.

Number 1' in FIG. 3 indicates as a whole a different embodiment of a basic unit of sheet packaging material 2 according to the present invention. Since basic unit 1' is similar to basic unit 1, the following description is limited to the differences between them, and using the same references, where possible, for identical or corresponding parts.

In particular, basic unit 1' differs from basic unit 1 by comprising a bottom crease pattern 11' including four longitudinal crease lines 19a', 19b' which do not intersect bottom transversal crease line 7.

In other words, only the projections of each longitudinal line 19a', 19b' along longitudinal direction A intersect continuous line C, in particular bottom transversal crease line 7, at the respective second points Q2, while the respective end of each longitudinal line 19a', 19b' do not reach bottom transversal crease line 7.

This is visible in particular, for a single longitudinal line 19a' of bottom crease pattern 11', in FIG. 4: such longitudinal crease line 19a' does not reach bottom transversal crease line 7, whereas the projection of such longitudinal crease line 19a' along longitudinal direction A does.

Figure 5:
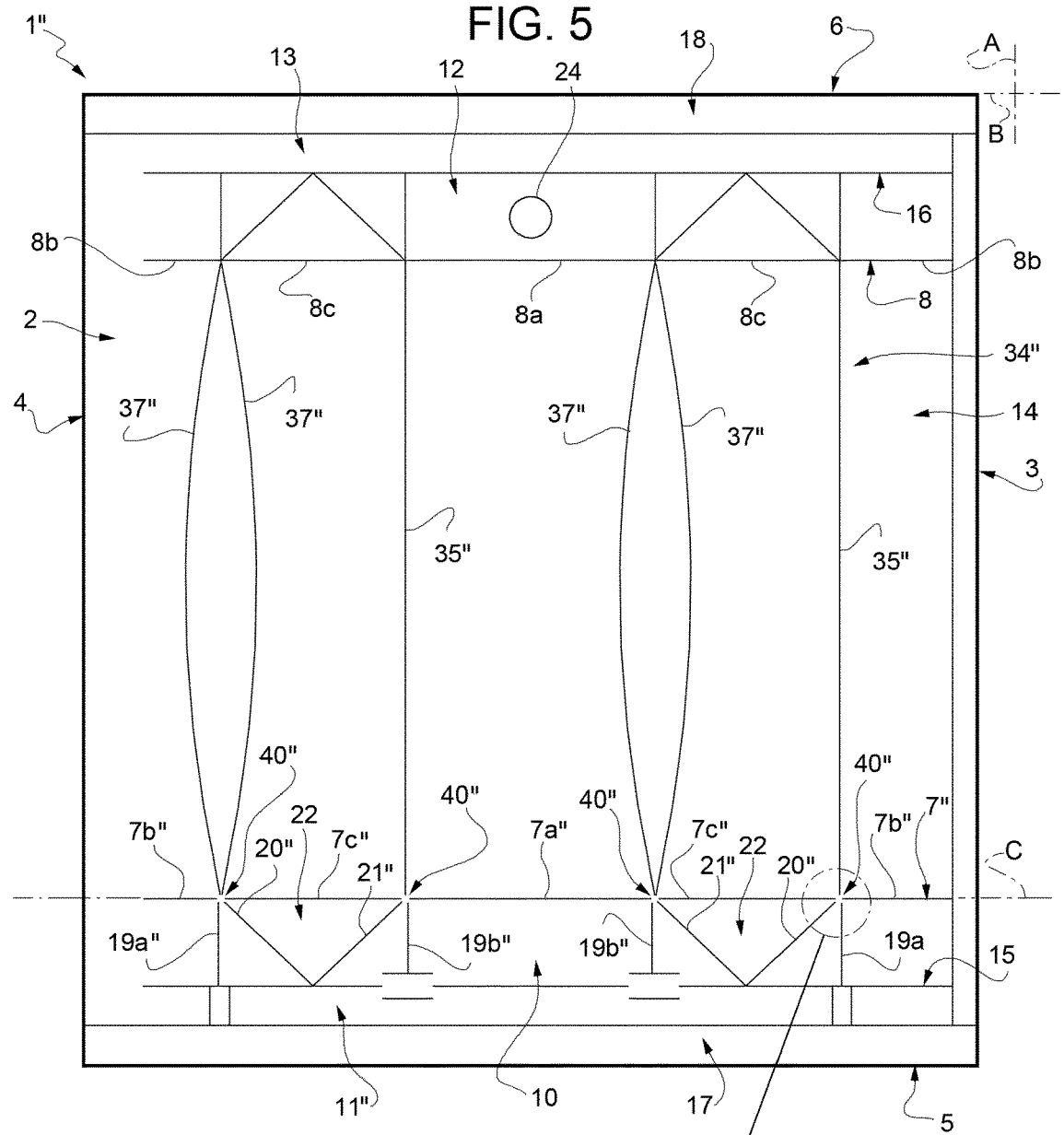
FIG. 5 is a front view of a basic unit of a sheet packaging material according to a third embodiment of the present invention.

Number 1" in FIG. 5 indicates as a whole a further embodiment of a basic unit of sheet packaging material 2 according to the present invention. Since basic unit 1" is similar to basic unit 1', the following description is limited to the differences between them, and using the same references, where possible, for identical or corresponding parts.

In particular, basic unit 1" differs from basic unit 1' by comprising a bottom transversal crease line 7" which is interrupted at least at first points Q1, at the corresponding second points Q2 and between first points Q1 and the corresponding second points Q2.

In practice, bottom transversal crease line 7" is not continuous, but is interrupted at some portions thereof, as described above.

Furthermore, basic unit 1" differs from basic unit 1' by comprising a bottom crease pattern 11" including two pairs of slanted crease lines 20", 21" which do not intersect continuous line C, in particular bottom transversal crease line 7.

In other words, only the projections of slanted crease lines 20", 21" along the respective directions parallel to such slanted crease lines 20", 21" intersect continuous line C at the respective first points Q1, while the respective ends of slanted crease lines 20", 21" do not reach continuous line C.

Additionally, likewise to bottom crease pattern 11', bottom crease pattern 11" includes four longitudinal crease lines 19a", 19b" which do not intersect continuous line C.

Moreover, basic unit 1" differs from basic unit 1' by comprising an intermediate crease pattern 34" including two intermediate longitudinal crease lines 35" and two pairs of intermediate curved crease lines 37" which do not intersect continuous line C, in particular bottom transversal crease line 7.

In other words, only the projections of intermediate longitudinal crease lines 35" or of intermediate curved crease lines 37" on continuous line C, respectively along longitudinal direction A or directions parallel to intermediate curved crease lines 37", intersect continuous line C at respective first points Q1.

In light of the above, bottom crease pattern 11' and intermediate crease pattern 34" comprise a plurality of void portions 40" in which no crease line is present.

Figure 6:
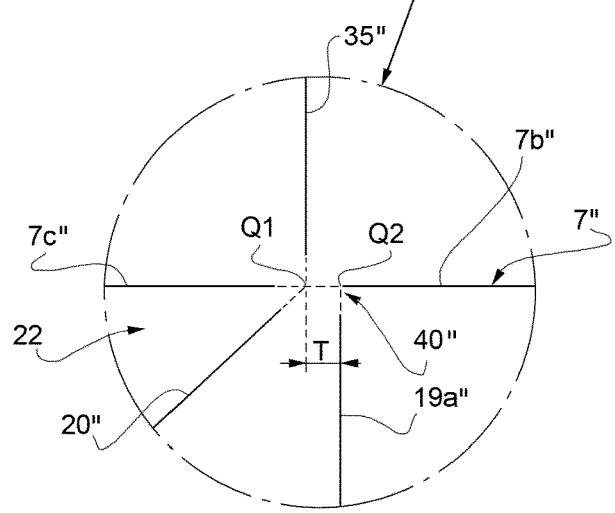
FIG. 6 is a larger-scale, partial front view of a detail of the sheet packaging material of FIG. 5.

This is visible in FIG. 6, for a single void portion 40".

Number 1''' in FIG. 7 indicates as a whole a further embodiment of a basic unit of sheet packaging material 2 according to the present invention. Since basic unit 1''' is similar to basic unit 1, the following description is limited to the differences between them, and using the same references, where possible, for identical or corresponding parts.

In particular, basic unit 1''' differs from basic unit 1 by comprising a bottom crease pattern 11''' having a bottom transversal crease line 7''' that includes a bottom central portion 7a''', two bottom end portions 7b''' and two bottom side portions 7c''' which are not aligned to one another and to continuous line C.

In detail, bottom central portion 7a''', bottom end portions 7b''' and bottom side portions 7c''' are parallel to one another and to continuous line C, but bottom side portions 7c''' are spaced from continuous line C by a longitudinal offset along longitudinal direction A.

In greater detail, bottom side portions 7c''' are closer to bottom boundary edge 5 than bottom central portion 7a''' and bottom end portions 7b'''.

Therefore, bottom central portion 7a''' and bottom end portions 7b''' are closer to top transversal crease line 8 than bottom side portions 7c'''.

Hence, according to this preferred embodiment, triangular areas 22 are smaller than triangular areas 22 according to the previously described embodiments.

The advantages of basic unit 1, 1', 1", 1''' of packaging material 2 according to the present invention will be clear from the foregoing description.

In particular, transversal offset T allows to compensate for the thickness of packaging material 2 during forming of bottom portion 25, in particular during folding of the bottom lateral flaps. This misaligned configuration of longitudinal crease lines 19a, 19b, 19a', 19b', 19a", 19b" permits to perform the folding of such bottom lateral flaps avoiding any weakening of sheet packaging material 2, especially along the longitudinal crease lines 19a, 19b, 19a', 19b', 19a", 19b", since the local stress arising on such crease lines is reduced, due to the above-mentioned compensation.

Furthermore, in the configuration in which longitudinal crease lines 19a', 19b' do not converge on bottom crease line 7, the local stress during folding is even more reduced.

This is far more accentuated thanks to bottom crease pattern 11" and intermediate crease pattern 34". In fact, thanks to the presence of void portions 40", the local stress applied, during folding, on the points of convergence of the various crease lines is reduced, as such convergence points are removed. In addition, the forming of package P, especially at the corners of package P, is improved.

Clearly, changes may be made to basic unit 1, 1', 1", 1''' of packaging material 2 as described herein without, however, departing from the scope of protection as defined in the accompanying claims.

In particular, bottom side crease portions 7c''' could be implemented in any of the basic unit 1' and 1".

The invention claimed is:

1. A rectangle-shaped sheet packaging material for producing a sealed package containing a pourable product; said sheet packaging material comprising two first boundary edges parallel to a longitudinal direction and two second boundary edges parallel to a transversal direction orthogonal to said longitudinal direction;

said sheet packaging material comprising at least a bottom transversal crease line and a top transversal crease line dividing said sheet packaging material into:

a bottom region containing a bottom crease pattern and configured to form a bottom portion of said package including a bottom panel;

a top region containing a top crease pattern; and an intermediate region contained between said bottom transversal crease line and said top transversal crease line and interposed between said bottom region and said top region, with respect to said longitudinal direction;

said bottom transversal crease line including:

a bottom central portion;

at least one bottom end portion arranged on one side of said bottom central portion and adjacent to one of said first boundary edges; and at least one bottom side portion, adjacent to one side of said bottom central portion and extending between said bottom central portion and said at least one bottom end portion;

said bottom crease pattern including at least a pair of slanted crease lines inclined relatively to both said longitudinal direction and said transversal direction and extending within said bottom region;

wherein said slanted crease lines have first ends pointing to one of said second boundary edges and second ends pointing to a continuous line parallel to said transversal direction and including said bottom central portion and said at least one bottom end portion of said bottom transversal crease line; said slanted crease lines delimiting, together with said at least one bottom side portion, a flap area of said sheet packaging material designed to form at least part of a lateral flap of said package;

wherein a projection of each slanted crease line on said continuous line along a respective direction parallel to said slanted crease line identifies on said continuous line one respective first point;

said bottom crease pattern further including at least a pair of longitudinal crease lines extending within said bottom region, arranged at opposite sides of said flap area relatively to said transversal direction, and defining together a folding line about which said lateral flap is designed to be folded inwardly towards said bottom panel;

a projection of each longitudinal crease line on said continuous line along a respective direction parallel to said longitudinal crease line identifies on said continuous line one respective second point, said second point being arranged at one side of said flap area and being spaced, along said transversal direction, from the corresponding first point arranged at the same one side of said flap area by a transversal offset;

wherein said bottom central portion, said at least one bottom end portion and said at least one bottom side portion of said bottom transversal crease line are co-linear with one another and with said continuous line.

2. The sheet packaging material as claimed in claim 1, wherein each said first point is closer to said flap area than the corresponding adjacent second point.

3. The sheet packaging material as claimed in claim 1, wherein said second points are respectively spaced from said corresponding first points by respective equal transversal offsets.

4. The sheet packaging material as claimed in claim 1, wherein said intermediate region contains an intermediate crease pattern comprising at least one intermediate crease line configured to form a lateral edge of said main portion of said package;

wherein a projection of said intermediate crease line on said continuous line along a direction parallel to said intermediate crease line coincides with one of said first points.

5. The sheet packaging material as claimed in claim 4, wherein said intermediate crease line intersects said bottom transversal crease line at said one of said first points.

6. The sheet packaging material as claimed in claim 5, wherein said longitudinal crease lines intersect said bottom transversal crease line at said second points.

7. The sheet packaging material as claimed in claim 1, wherein said slanted crease lines intersect said bottom transversal crease line at said first points.

8. The sheet packaging material as claimed in claim 1, wherein said bottom transversal crease line is interrupted at least at each said first point, at the corresponding second point, and between each first point and the corresponding second point.

9. The sheet packaging material as claimed in claim 1, wherein said bottom crease pattern comprises two pairs of said slanted crease lines and wherein said bottom transversal crease line comprises two bottom side portions arranged at opposite sides of said bottom central portion; said slanted crease lines delimiting, together with the corresponding bottom side portion, two respective said flap areas designed to form at least part of two respective said lateral flaps of said package;

wherein said bottom crease pattern comprises two pairs of said longitudinal crease lines, one for each pair of said slanted crease lines;

and wherein said longitudinal crease lines of each pair are arranged at opposite sides of the respective flap area.

10. A sealed package-containing a pourable product obtained from a sheet packaging material as claimed in claim 1; said package comprising a bottom portion, a top portion and a main portion interposed between said bottom portion and said top portion and including a plurality of side walls;

wherein said main portion is divided from said bottom portion and said top portion respectively by a bottom peripheral edge and a top peripheral edge;

and wherein said bottom transversal crease line defines said bottom peripheral edge and said top transversal crease line defines said top peripheral edge.

* * * * *